Figure 1:
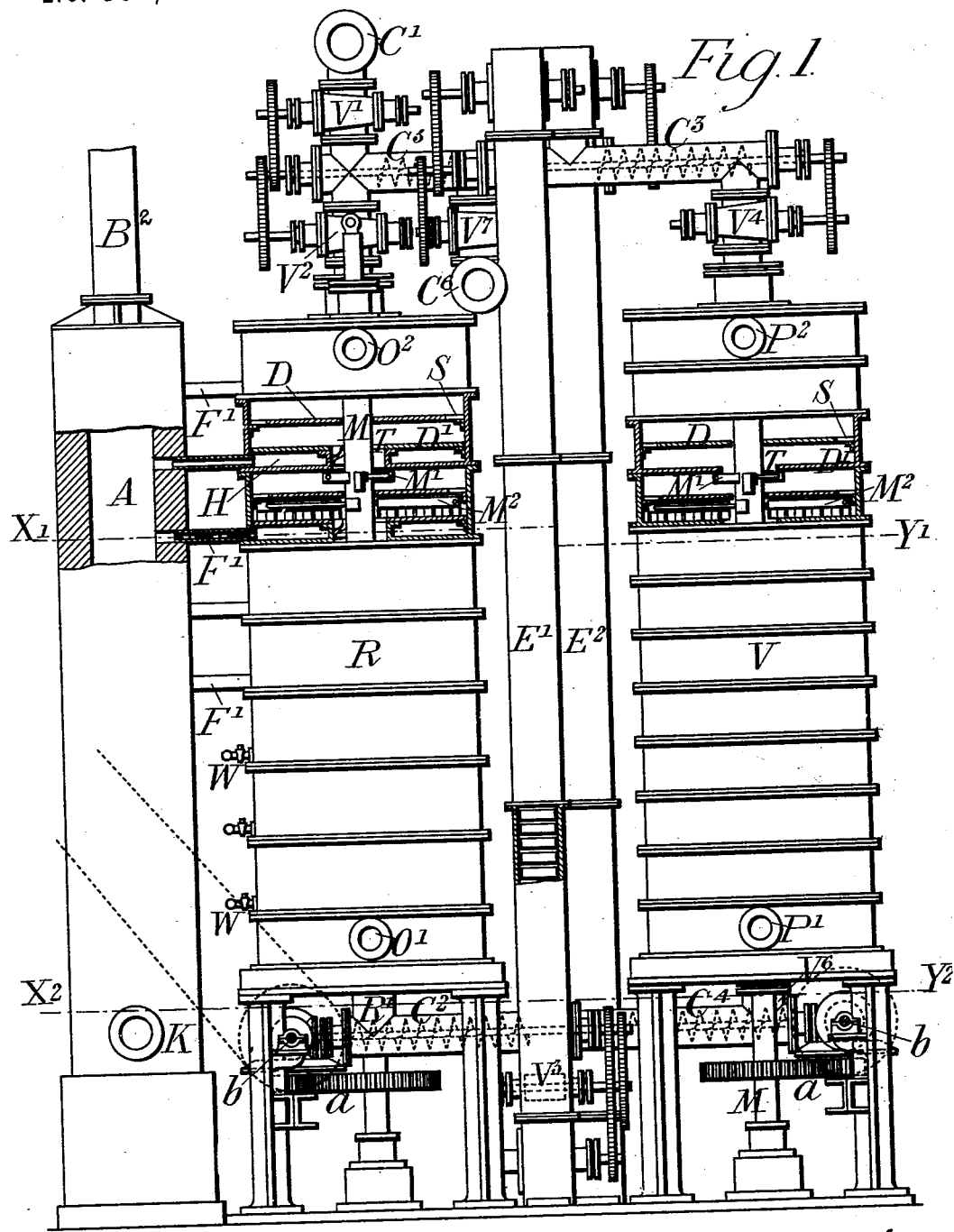

(No Model.) 3 Sheets—Sheet 2.
L. MOND.
APPARATUS FOR TREATING NICKEL ORES OR OTHER MATERIALS
CONTAINING NICKEL WITH CARBON MONOXID.

No. 551,220. Patented Dec. 10, 1895.

Witnesses
Inventor.
Ludwig Mond.
By James L. Norris.
Atty.

(No Model.) 3 Sheets—Sheet 3.

L. MOND.
APPARATUS FOR TREATING NICKEL ORES OR OTHER MATERIALS CONTAINING NICKEL WITH CARBON MONOXID.

No. 551,220. Patented Dec. 10, 1895.

Witnesses.
Thos. A. Gunn
Robert Everett

Inventor
Ludwig Mond.
By James L. Norris.
Atty.

UNITED STATES PATENT OFFICE.

LUDWIG MOND, OF LONDON, ENGLAND.

APPARATUS FOR TREATING NICKEL ORES OR OTHER MATERIALS CONTAINING NICKEL WITH CARBON MONOXID.

SPECIFICATION forming part of Letters Patent No. 551,220, dated December 10, 1895.

Application filed September 5, 1895. Serial No. 561,587. (No model.)

*To all whom it may concern:*

Be it known that I, LUDWIG MOND, a citizen of England, residing at No. 20 Avenue Road, Regents Park, London, in the county of London, England, have invented certain new and useful Improvements in Apparatus for Treating Nickel Ores or other Materials Containing Nickel with Carbon Monoxid, of which the following is a specification.

My invention relates to apparatus for carrying out the process whereby nickel is treated with carbon monoxide which combines with the nickel forming a volatile compound, from which the nickel is afterward separated.

The said apparatus consists for this purpose of two main parts. The one part, which I call the "reducer," serves to reduce the nickel oxide contained in the material to be treated to the metallic state, while the other part, which I call the "volatilizer," serves to subject the reduced material to the action of carbon monoxide, whereby the nickel is made to form a volatile compound with the latter, as above stated. The said reducer and volatilizer are for this purpose constructed as upright cylindrical or otherwise shaped chambers containing a number of superposed trays or shelves, from the uppermost one of which it is made by suitable stirring apparatus to travel downward successively over all the trays to the bottom, while at the same time, in the case of the reducer, suitable reducing-gas is passed upward and in the case of the volatilizer carbon monoxide is passed upward. The reduced material discharged from the bottom of the reducer is conveyed to an elevator which raises it to the top of the volatilizer, down which it is made to travel, as described, while the carbon monoxide, in passing up in contact therewith, takes up the nickel in the form of vapor. When arrived at the bottom of the volatilizer, the material is again raised by an elevator to the top of the reducer, in which it is again acted upon by the reducing-gas, and is then again passed down through the volatilizer, where a further quantity of nickel is taken up by carbon monoxide, and this operation is repeated until the material is sufficiently exhaused. The carbon monoxide charged with the nickel vapor passing off from the volatilizer is passed through heating-chambers, where the nickel is deposited therefrom in metallic form, and the carbon monoxide thus regenerated is then used over again in the apparatus.

Having thus generally described the construction and mode of operation of my said apparatus, I will now describe a special construction of the same with reference to the accompanying drawings, in which—

Figure 2:
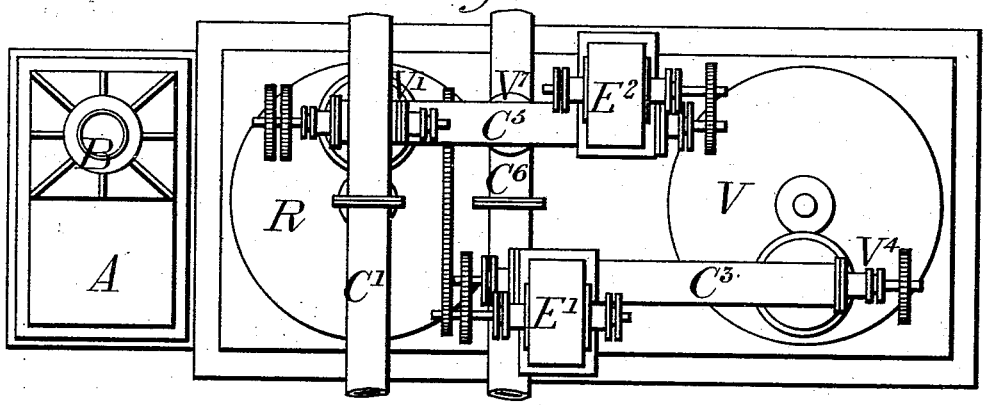
Figure 3:
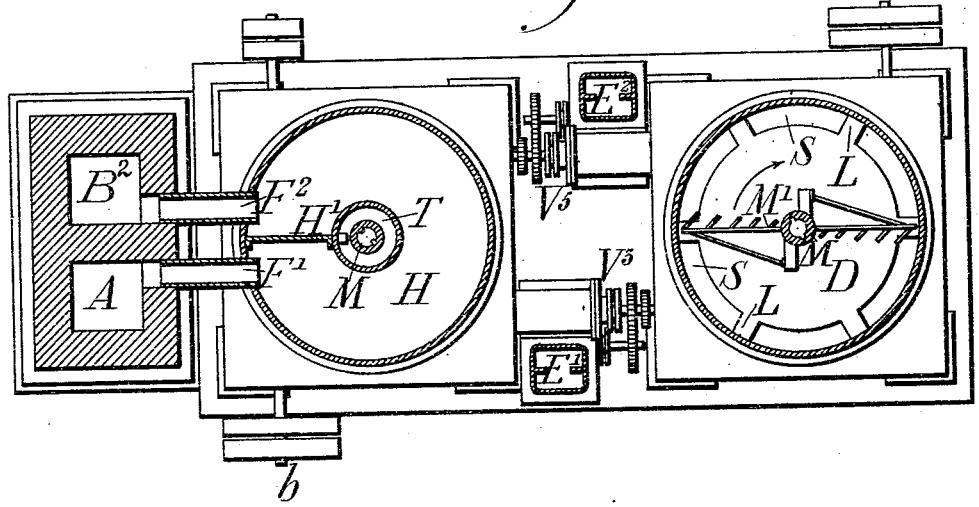
Figure 4:
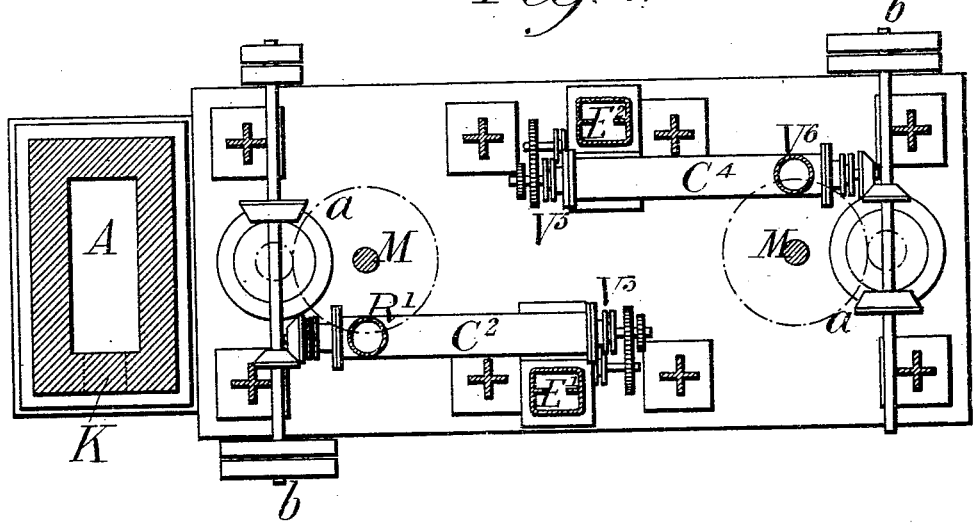

Figure 1 shows an elevation of the apparatus, partly in section. Fig. 2 is a plan. Figs. 3 and 4 show cross-sections taken, respectively, on the lines $X'$ $Y'$ $X^2$ $Y^2$ of Fig. 1.

R is the reducer, and V is the volatilizer. Each of these consists of a cylindrical chamber built up of a number of short cylinders, which are each divided by plates D, having projections L, into two compartments, which communicate with each other through the peripheral openings S between the projections L, which serve to support the plate on lugs on the cylinder sides.

At the lower end of each cylinder is another plate $D'$, having a central opening T. In the reducer R a chamber H is formed below this plate which is connected, in the upper cylinders, with a combustion-chamber A by means of short flues $F'$ $F^2$, for maintaining a raised temperature in the two compartments, the chambers H being provided with a partition $H'$, as shown at Fig. 3, on one side of which the flue $F'$ communicates with the combustion-chamber A, while on the other side the flue $F^2$ communicates with the chimney-stack $B^2$, so that the hot combustion-gases are made to circulate through the chambers H.

The chambers H of the lower cylinders are connected by branch pipes with taps or valves W to a water or air supply and waste pipe for circulating water or air for cooling the reduced hot material.

Centrally through the cylinders R and V pass vertical shafts M, which are rotated by gearing $a$ from driving-shafts $b$, and which carry in each compartment of the cylinders stirrers $M'$ and $M^2$, of which the stirrers $M'$ serve to convey the material on the plate D from the center toward the periphery, where it falls through the openings S onto the plate $D'$ below. Here the stirrers $M^2$ are so arranged as to convey the material from the periphery of the plate to the central opening T, through which it falls onto the center of the next plate D below, and so on in succession. This arrangement of plates and stirrers is well known, and does not of itself form part of my invention. For it may be substituted any other suitable arrangement for causing the material to pass down from one plate or tray to another.

At the lower ends of the cylinders R and V are side openings O' and P', that are made to communicate respectively with a supply of a reducing-gas and a supply of carbon monoxide, which gases consequently rise up through the cylinders in contact with the descending materials. At the upper ends are openings P² and O², through which such gases escape.

The cylinders R and V are connected with each other by means of air-tight conveyers C² C³ C⁴ C⁵, of known construction, and air-tight elevators E' E², also of known construction, in such manner that the material under treatment can be transported from the reducer into the volatilizer, and vice versa, without coming in contact with air.

Figure 5:
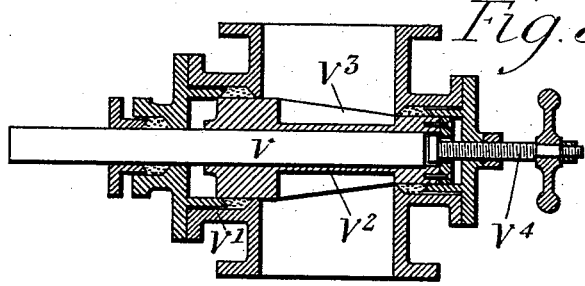
Figure 6:
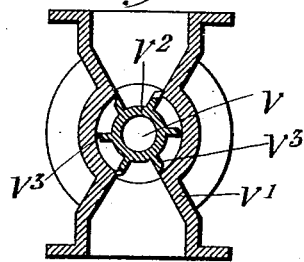

As the gases passing the two sections are of a different nature and have to be kept separate, the connections between the conveyers, elevators, reducer, and volatilizer are provided with rotary valves V' V², &c., which feed forward the powdered material, but prevent the gases from mixing. The construction of the said rotary feed-valves V', &c., is shown in longitudinal and cross-section, respectively, at Figs. 5 and 6.

On a spindle $v$, one end of which passes through a stuffing-box in the coned casing $v'$, is mounted the conical rotary valve consisting of a cylindrical boss $v^2$ with tapering wings $v^3$, the valve being secured on the spindle by a groove and feather which allow it to slide longitudinally thereon. The smaller end of the valve is carried in a stuffing-box in the casing, through which passes a screw $v^4$ with hand-wheel, the inner end of which screw is connected by a head to the end of the valve, so that by means of the screw the conical valve can be adjusted in the casing, so as to insure a close fit. Thus it will be seen that while by the rotation of the valve it will convey the material in the spaces between its wings from the inlet to the outlet of the casing, it will effectually prevent the passage of gas beyond the small quantity that may be mixed with the material.

The above-described apparatus operates as follows: The material to be treated is transported by the conveyer C' into the top of the reducer R through the rotary feeding-valves V' and V². The stirrers M' M², operating as above described, cause the material to descend from one compartment to another, while at the same time it is acted upon under the influence of heat by the reducing-gas entering at P'. Arrived at the bottom of R, the material, which now contains metallic nickel, drops through pipe R' into the conveyer C², which transports it to the elevator E', by which it is raised and supplied to the conveyer C³, and this supplies it through the rotary valve V⁴ into the top of the volatilizer V. Here the material is acted upon by the stirrers M' and M², as before described, so as to cause it to pass down from one compartment to the other while being acted upon by the carbon monoxide gas which volatilizes the nickel therefrom. From the bottom of V the more or less exhausted material falls through pipe V⁶ into the conveyer C⁴, which supplies it to the elevator E². This lifts it to the conveyor C⁵, from which it is supplied through rotary valve V² back again into the reducer R, or it may be passed through the rotary valve into conveyer C⁶ for emptying the apparatus after the extraction of the nickel from the material has been sufficiently accomplished.

The combustion-chamber A for heating the reducer is preferably fired by gaseous fuel introduced through the opening at K.

The reduction of the material in the reducer R is preferably effected by means of water-gas or by producer-gas containing hydrogen, introduced through O', as before described.

The carbon monoxide for volatilizing the liquid, which is preferably employed as pure as practicable, enters the volatilizer through opening P' and leaves it through P², whence it is passed through heated chambers for the separation of the nickel and regeneration of the carbon monoxide, as before described.

Having thus described the nature of my said invention and the best means I know for carrying the same into practical effect, I claim—

1. Apparatus for treating materials containing nickel with carbon monoxide, consisting of the combination of a chamber adapted for reducing the material by reducing gases at an elevated temperature, a chamber adapted for treating the same with carbon monoxide, means for causing the ores to descend over superposed trays in each compartment, means for conveying the material discharged from the bottom of the reducing chamber to the top of the volatilizing chamber, means for supplying the lower end of the reducing chamber with reducing gases, means for supplying the lower end of the evaporating chamber with carbon monoxide, and means for discharging the said gases from the upper ends of said chambers, substantially as described.

2. Apparatus for treating materials containing nickel with carbon monoxide, consisting of the combination of a chamber adapted for reducing the material by reducing gases at an elevated temperature, a chamber adapted for treating the same with carbon monoxide, means for causing the ores to descend over superposed trays in each compartment, means for conveying the material discharged from the bottom of the reducing chamber to the top of the volatilizing chamber, means for supplying the lower end of the reducing chamber with reducing gases, means for supplying the lower end of the evaporating chamber with carbon monoxide, and means for discharging the said gases from the upper ends of said chambers, and rotary feed valves operating in combination with the conveyers and elevators adapted to feed the material from the reducer to the volatilizer and vice versa while preventing the gases in the one chamber from mixing with those in the other chamber, substantially as described.

3. Apparatus for reducing material containing nickel, preparatory to its treatment with carbon monoxide, consisting of a cylindrical vessel R, divided into compartments by superposed trays D D', a stirring device adapted to cause the material to descend consecutively from one compartment to the other, chambers H on the under side of every alternate tray D', communicating on one side of a partition by flues F' with a combustion chamber for gaseous fuel A, and on the other side of said partition by means of flues $F^2$ with a chimney shaft B, means for supplying the material to be reduced at the top of the chamber R and for discharging the same at the bottom of said chamber, and means for passing reducing gas through the said chamber, substantially as described.

In testimony whereof I have signed my name to this specification, in the presence of two subscribing witnesses, this 16th day of August, A. D. 1895.

LUDWIG MOND.

Witnesses:
CHAS. D. ABEL,
JNO. P. M. MILLARD.